US006866336B2

United States Patent
De Gaillard

(10) Patent No.: US 6,866,336 B2
(45) Date of Patent: Mar. 15, 2005

(54) WIND DEFLECTOR ARRANGEMENT FOR A MOTOR VEHICLE ROOF

(75) Inventor: Francois De Gaillard, Mouilleron en pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/369,135

(22) Filed: Feb. 20, 2003

(65) Prior Publication Data

US 2003/0234560 A1 Dec. 25, 2003

(30) Foreign Application Priority Data

Feb. 20, 2002 (DE) ........................................ 102 08 185

(51) Int. Cl.[7] .................................................. B60J 7/22
(52) U.S. Cl. ...................................................... 296/217
(58) Field of Search ......................................... 296/217

(56) References Cited

U.S. PATENT DOCUMENTS

| | | | |
|---|---|---|---|
| 5,040,845 A | * | 8/1991 | Huyer ........................ 296/222 |
| 5,052,746 A | | 10/1991 | Reihl et al. |
| 5,306,069 A | * | 4/1994 | Becker et al. .............. 296/217 |
| 6,443,520 B1 | * | 9/2002 | Schmaelzle et al. ... 296/216.08 |

FOREIGN PATENT DOCUMENTS

| | | |
|---|---|---|
| DE | 41 15 627 C1 | 7/1992 |
| DE | 198 27 106 A1 | 1/1999 |
| DE | 198 22 006 A1 | 11/1999 |
| EP | 0 381 263 A1 | 8/1990 |
| EP | 1338455 A1 * | 2/2003 |

* cited by examiner

*Primary Examiner*—Dennis H. Pedder
(74) *Attorney, Agent, or Firm*—Nixon Peabody LLP; David S. Safran

(57) ABSTRACT

A wind deflector arrangement for a motor vehicle roof (2) with a roof opening (3) which can be selectively closed by at least one movable closure (7) and can be at least partially cleared by moving the closure (7) in a forward direction, has a wind deflector (9) which runs in the transverse direction of the motor vehicle roof, with the closure (7) opened, and which is located at the rear edge (16) of the closure (7) in the active position. In order to devise an improved lowered position, it is provided that the wind deflector (9) has a rest position which is located under the fixed roof part (5) of the motor vehicle roof (2) which borders the rear of the roof opening (3).

14 Claims, 2 Drawing Sheets

WIND DEFLECTOR ARRANGEMENT FOR A MOTOR VEHICLE ROOF

BACKGROUND OF THE INVENTION

1. Field of the Invention

The invention relates to a wind deflector arrangement for a motor vehicle roof with a roof opening which can be selectively closed by a movable closing means and can be at least partially cleared by moving the closing means in the lengthwise direction of the roof, the wind deflector running in the transverse direction of the motor vehicle roof and being located on the rear edge of the closing means in the active position with the closing means opened.

2. Description of Related Art

German Patent DE 41 15 627 C1 disclosed a wind deflector arrangement for a motor vehicle roof with a roof opening which can be opened and closed by at least one movable cover and which has a wind deflector on its rear edge. This wind deflector is supported to be able to move lengthwise on the cover such that, with the cover closed, in its rest position, the wind deflector is located underneath the cover, and when the cover is being opened, the wind deflector extends into an active position counter to the direction of cover displacement. In its rest position underneath the cover, the wind deflector is not visible either from the outside or the inside.

SUMMARY OF THE INVENTION

The primary object of the invention is to provide a wind deflector arrangement with a wind deflector of the initially mentioned type which is located, in its rest position, on the motor vehicle roof in an improved position with high functionality, and to provide a motor vehicle roof with such a wind deflector.

This object is achieved in the initially mentioned wind deflector arrangement as claimed in the invention in that the wind deflector in its rest position is located under the roof part of the motor vehicle roof which borders the roof opening at the rear. By this arrangement, under the roof part which is formed, for example, by or on a transverse roof member, the rear section of the closing means, especially a glass cover, is not covered on the bottom in the closed state. In this way, with a glass cover, it remains possible to look through the cover unhindered. Furthermore, in the closed position of the cover, no receiving space for the wind deflector on the bottom of the cover is necessary so that the head space in this area is improved.

Preferably, the wind deflector is supported on both sides on the motor vehicle roof on guides and can be moved by a drive so that the wind deflector can follow the rear edge of the closing means which opens in a direction toward the front of the roof. Thus, the wind deflector can always be positioned on the front edge of the roof opening in order to achieve an optimum air guiding action over the roof opening. This is possible regardless of the size of the roof opening which has been set at the time and which is fixed by the displacement position of the closing means, especially of a sliding roof cover.

The wind deflector can be driven by being coupled to the closing means and being moved by it. On the other hand, the wind deflector can also have its own drive, for example, an electric motor, which can push the wind deflector to via a drive cable.

Feasibly, the wind deflector contains a respective bearing means which supports the wind deflector on each side of the roof so to be able to move and pivot on a respective guide on the motor vehicle roof or on lateral, lengthwise roof members or the roof frame on the cutout for the roof opening.

Preferably, the bearing means comprises a bearing arm which is supported on the guide by means of a sliding and pivoting part. The bearing arm is permanently joined to the wind deflector, and in its closed position, depending on the design, projects down in a straight line or at a slant.

To control the motion of the wind deflector, it is preferred that the guide has at least one guide track which runs in such a way as to control the dynamic behavior of the wind deflector. Then, the guide or the guide track dictates the progression of the motion while the drive or coupling moves the wind deflector. The guide can have a guide track with a lowered rear section by which the wind deflector is lowered or swung down from its raised active position into its rest position, which is roughly horizontal or also slightly inclined, to under the rear roof section.

According to one simple embodiment, the coupling rod connects the wind deflector to the closing means. The coupling rod can be rigidly connected to the closing means and coupled to the wind deflector at a pivot axis or it is also movably supported on the closing means.

The closing means is formed, for example, by the cover of a sliding roof, by a louvered roof or by a folding roof and especially contains two covers which are located in succession, one behind the other in the direction of travel, and which are produced preferably from a transparent material and are especially glass covers.

When the wind deflector has its own drive, the drive can be controlled by a control means depending on the position or motion of the closing means or of the cover or independently thereof. Thus, the drive means can move the wind deflector continuously with the motion of the cover or it allows displacement offset in time or offset in its path or entirely independent displacement.

The object is finally achieved by a motor vehicle roof with a wind deflector arrangement with one or more of the aforementioned features.

One embodiment of the wind deflector arrangement is explained in detail below with reference to the accompanying drawings.

DETAILED DESCRIPTION OF THE INVENTION

Figure 1:
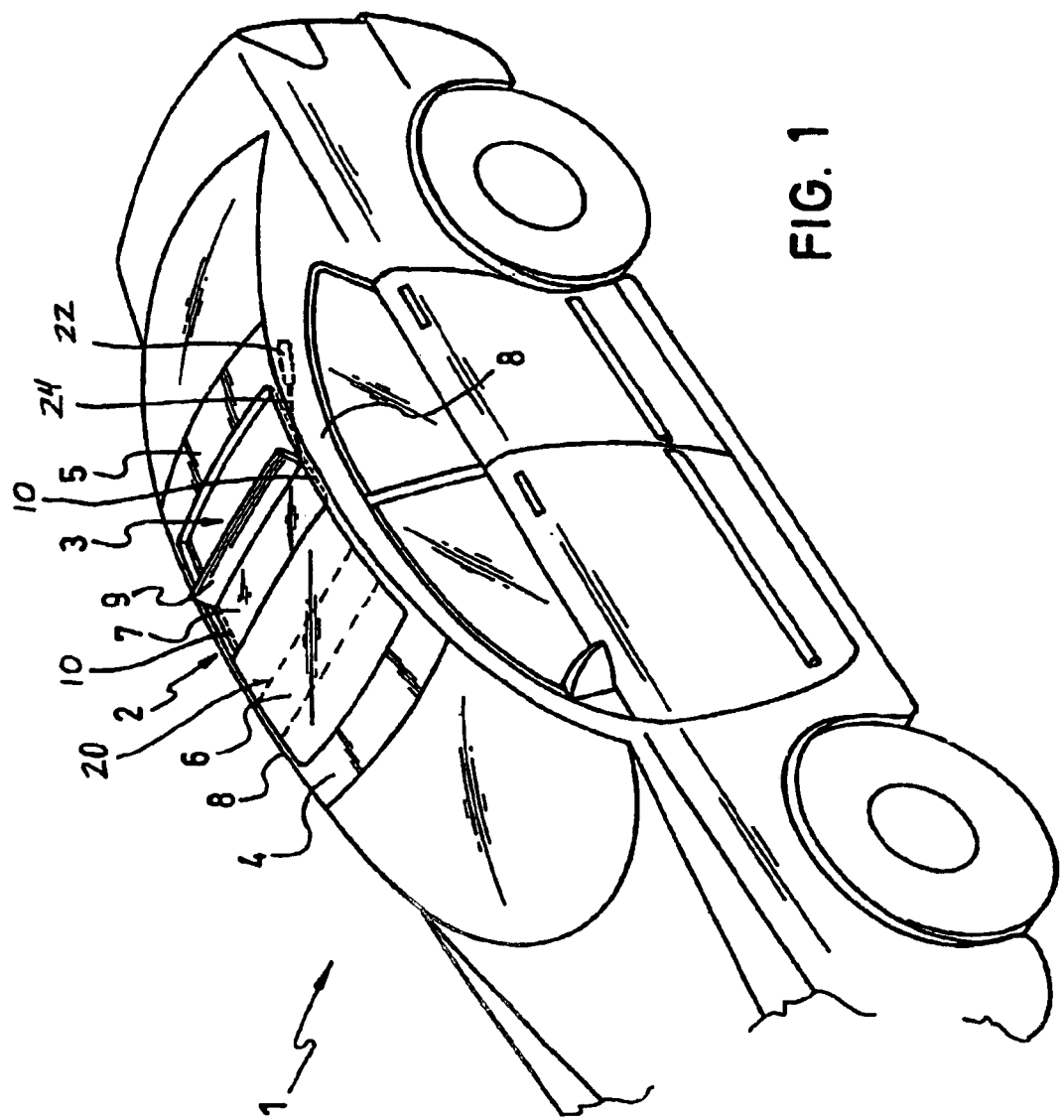
FIG. 1 is a perspective view of a passenger vehicle with two covers which are movably located in the roof opening of the motor vehicle roof and with a wind deflector in the active position on the rear edge of the rear opened cover.
Figure 2:
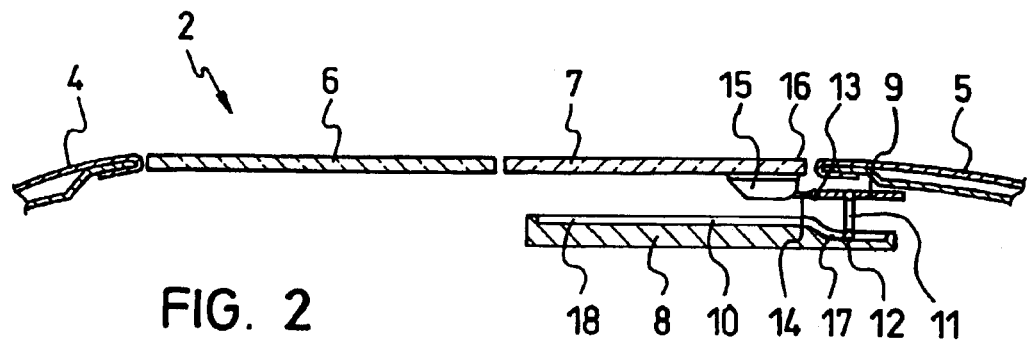
FIG. 2 is a lengthwise section of the motor vehicle roof with the covers closed and the wind deflector in the lowered rest position.
Figure 3:
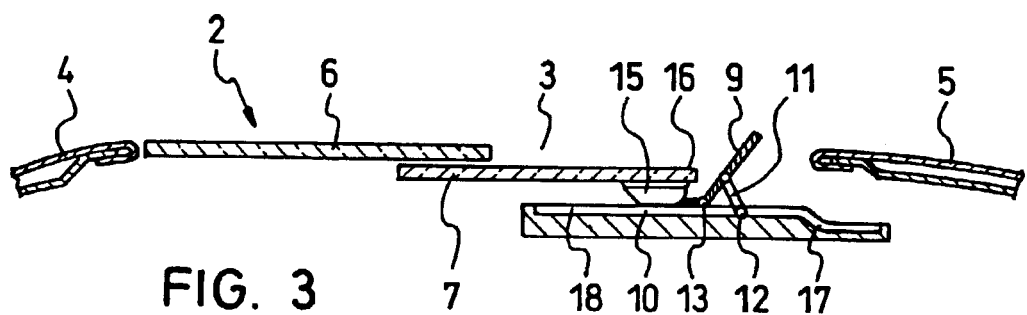
FIG. 3 is a lengthwise sectional view of the motor vehicle roof with the rear cover being pushed forward into the partially open position and the wind deflector being raised into the active position.
Figure 4:
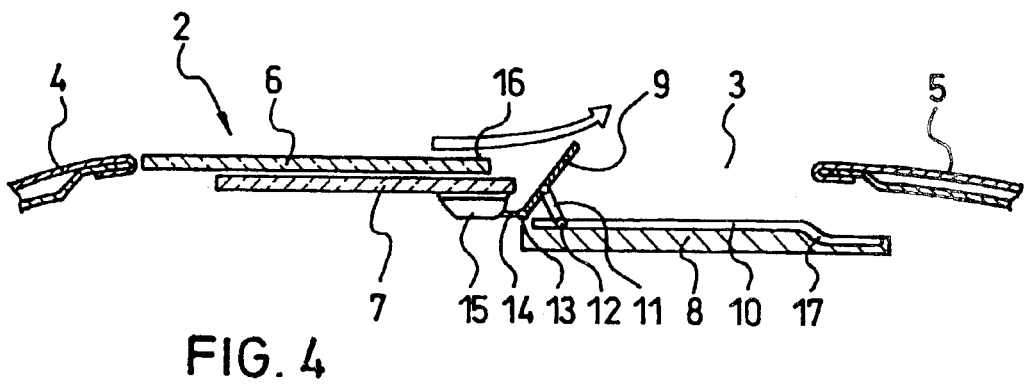
FIG. 4 is a lengthwise section of the motor vehicle roof with the rear cover being pushed forward into its full open position and the wind deflector, which has been raised into the active position, having followed the rear edge of the cover.

A passenger vehicle 1 (see FIG. 1) has a motor vehicle roof 2 with a roof opening 3 which extends between a front fixed roof section 4 and a rear fixed roof section 5, and which can be selectively closed and at least partially opened by a closing means. The closing means, in the embodiment shown, has a front cover 6 and a rear cover 7 which are especially glass covers, which are arranged in the roof opening 3, one behind the other in the closed position (FIG. 2), and of which at least the rear cover 7 is movably guided on guides (not shown) on side roof members 8 in a conventional manner, and can be moved from its closed position forward to under the front cover 6 (FIGS. 3 & 4). The front cover 6 can be permanently attached in the roof opening 3 or in the roof cutout which is formed for the covers 6, 7 or it can be supported to be able to slide and/or to be raised. Alternatively, the sliding roof may be a louvered roof as indicated generally at 20.

A wind deflector arrangement for the motor vehicle roof 2 comprises a louver-like wind deflector 9 which has roughly the width of the roof opening 3 and is movably guided on either side on a respective guide track 10 which is located on the respective side roof member 8, underneath the surface of the fixed roof sections 4, 5, and of the level of the closed covers 6, 7 (the wind deflector arrangement is described using components which are on the left side with respect to the motor vehicle roof and which are formed in the corresponding manner on the opposing right side). The wind deflector 9 has, a respective bearing arm 11 on each side, the bearing arm 11 projecting down from the wind deflector 9 and being held to move and pivot in the guide track 10 by means of a bearing part 12, for example, a bearing journal or a slide block, to which the bearing arm 11 is pivotally attached.

The wind deflector 9 is pivotably connected to a coupling rod 14 to pivot around an axis 13 in the area of its leading edge. The coupling rod 14 is attached to the reinforcing frame 15 which is attached to the bottom of the rear cover 7 adjacent to the rear edge 16 of the rear cover 7.

When the rear cover 7, in its closed position, closes the roof opening 3 (FIG. 2), the wind deflector 9 is in a roughly horizontal orientation under the rear fixed roof section 5. Here, the bearing part 12 of the bearing arm 11 is located in the rear section 17 of the guide track 10 in which its path is lowered as compared to the front section 18 of the guide track 10.

To clear the roof opening 3, the rear cover 7 is pushed forward to under the front cover 6, for example, by means of a conventional drive means 22 with side drive cables 24. In doing so, the cover 6 entrains the wind deflector 9 via the coupling rod 14, and first, pulls it from underneath the fixed rear roof section 5, forward into the area of the roof opening 3. As it continues to move forward, the bearing part 12 of the wind deflector 9 is raised in the ascending rear section 17 of the guide track 10 so that the wind deflector 9 is swung out around the pivot axis 13 into its active position (FIG. 3). According to the position of the pivot axis 13, which is determined by the coupling rod 14, the pivot position of the wind deflector 9 is adjusted relative to the position of the bearing part 12 in the guide track 10.

In the front position of the rear cover 7 (see FIG. 4), the section of the roof opening 3 assigned to the rear cover 7 is completely opened and the wind deflector 9, which due to its coupling to the rear edge 16 of the rear cover 7 follows the latter in its opening and closing motion, is in its active position in front of the roof opening 3. When the rear cover 7 is closed, in the reverse progression of motion, the wind deflector 9 is lowered again and pushed under the rear fixed roof section 5 where it is not visible from above. In this way, the rear area of the rear cover 7 remains free of the wind deflector which is located in the rest position, in contrast to the wind deflector arrangement as is known from the initially mentioned German Patent DE 41 15 627 C1. When the rear cover 7 is a glass cover, the transparent area of the glass cover is accordingly completely preserved.

In one alternative configuration, the pivot axis 13 of the wind deflector 9 is likewise guided on the guide track 10 or on an additional guide track. According to the establishment of the course of at least one guide track 10, the dynamic behavior of the wind deflector 9 can be adjusted. When the wind deflector 9 is supported and guided exclusively on the guide track or tracks 10, it can be moved along the guide track 10 or the guide tracks by its own drive means without direct mechanical coupling to the rear cover 7. The drive means is controlled depending on the position or the motion of the rear cover 7 so that the wind deflector 9 is likewise located in the area of the rear edge 16 of the rear cover 7.

What is claimed is:

1. Motor vehicle roof wind deflector arrangement comprising:

a motor vehicle roof with a roof opening;

a movable closing means for closing and at least partially opening the roof opening, the closing means being openable by moving in a direction toward a front end of the motor vehicle roof;

a wind deflector which runs in a transverse direction of the motor vehicle roof, the wind deflector having an active position, with the closing means opened, at a rear edge of the closing means and the wind deflector having a rest position located under a fixed part of the motor vehicle roof which borders the rear of the roof opening, wherein the wind deflector is supported, on both sides on the motor vehicle roof, on guides extending substantially along a longitudinal extent of the roof opening and is movable by a drive so that the wind deflector follows the rear edge of the closing means as the closing means is opened wherein said guides support movement of the wind deflector between said active and rest positions.

2. Motor vehicle roof wind deflector arrangement as claimed in claim 1, wherein the wind deflector is coupled to the closing means and is moved by it.

3. Motor vehicle roof wind deflector arrangement as claimed in claim 1, wherein the wind deflector has a bearing means, on each side of the roof, for supporting the wind deflector to move and pivot on a respective one of the guides.

4. Motor vehicle roof wind deflector arrangement as claimed in claim 3, wherein the bearing means comprises a bearing arm which is supported on the respective guide by a sliding and pivoting part.

5. Motor vehicle roof wind deflector arrangement as claimed in claim 4, wherein the guide comprises a guide track which controls the dynamic behavior of the wind deflector.

6. Motor vehicle roof wind deflector arrangement as claimed in claim 4, wherein the guide comprises a guide track with a lowered rear section.

7. Motor vehicle roof wind deflector arrangement as claimed in claim 1, wherein a coupling rod connects the wind deflector to the closing means.

8. Motor vehicle roof wind deflector arrangement as claimed in claim 1, wherein the closing means is formed by a cover of one of a sliding roof and a louvered roof.

9. Motor vehicle roof wind deflector arrangement as claimed in claim 8, wherein the cover is made of a transparent material.

10. Motor vehicle roof wind deflector arrangement as claimed in claim 1, wherein the closing means is formed by two covers which are located in succession, one behind the other.

11. Motor vehicle roof wind deflector arrangement as claimed in claim 10, wherein the covers are made of a transparent material.

12. Motor vehicle roof wind deflector arrangement as claimed in claim 1, wherein the drive of the wind deflector is adapted to set the position of the wind deflector depending on the position of the closing means.

13. Motor vehicle roof wind deflector arrangement as claimed in claim 1, wherein the guides comprise guide tracks with a lowered rear section.

14. Motor vehicle roof wind deflector arrangement as claimed in claim 13, wherein a coupling rod connects the wind deflector to the closing means.

* * * * *